United States Patent
Maeda et al.

(10) Patent No.: US 6,711,692 B1
(45) Date of Patent: Mar. 23, 2004

(54) DATA PROCESSING UNIT INCLUDING CENTRAL UNIT AND PERIPHERAL UNIT DRIVEN BY SEPARATE POWER SUPPLIES

(75) Inventors: Hiromi Maeda, Osaka (JP); Yukihiko Shimazu, Tokyo (JP); Masayuki Hata, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 09/580,209

(22) Filed: May 26, 2000

(30) Foreign Application Priority Data

Jan. 4, 2000 (JP) ........................ 2000-000142

(51) Int. Cl.$^7$ .............................. G06F 1/26; G06F 1/32
(52) U.S. Cl. ...................... 713/324; 713/322; 713/320; 713/310; 713/340
(58) Field of Search ................................ 713/310, 320, 713/340, 322, 300; 714/15, 17, 18, 19, 48

(56) References Cited

U.S. PATENT DOCUMENTS

| | | | |
|---|---|---|---|
| 5,689,714 A | * 11/1997 | Moyer | 713/310 |
| 6,134,017 A | * 10/2000 | Schlank et al. | 358/1.15 |
| 6,229,751 B1 | * 5/2001 | Kutaragi et al. | 365/229 |
| 6,345,369 B1 | * 2/2002 | Kitamorn et al. | 714/14 |
| 6,389,544 B1 | * 5/2002 | Katagiri | 713/300 |

FOREIGN PATENT DOCUMENTS

| | | | | |
|---|---|---|---|---|
| JP | 59-153222 | 9/1984 | | |
| JP | 04165448 A | * 6/1992 | .......... | G06F/13/24 |
| JP | 7-219816 | 8/1995 | | |
| JP | 07261886 A | * 10/1995 | ............. | G06F/1/30 |

OTHER PUBLICATIONS

Tiller, D.K.; Phil, D.; Newsham, G. R.; "Automatic power management of desktop computers", Industry Applications Society Annual Meeting, 1993., Conference Record of the 1993 IEEE, Oct. 2–8, 1993, Page(s): 1372–1376 vol. 2.*

* cited by examiner

*Primary Examiner*—Thomas Lee
*Assistant Examiner*—James K. Trujillo
(74) *Attorney, Agent, or Firm*—Burns, Doane, Swecker & Mathis, L.L.P.

(57) ABSTRACT

A data processing unit includes a first power supply consisting of a stable power supply, a central unit operating on the firsts power supply, a second power supply, a peripheral unit operating on the second power supply, an interface block for transferring an external signal to the peripheral unit, and a power-down detector operating on the first power supply and connected to the second power supply, for detecting a power down of the second power supply and for generating a signal informing of the power down when it occurs. This power down signal can prevent supply of the external input signal to the central unit. The data processing unit solves problems of conventional data processing units including separate central unit and peripheral power supplies in that an unexpected power down of the peripheral use power supply can cause malfunctions of the central unit because of, e.g., an undesired interrupt signal.

12 Claims, 4 Drawing Sheets

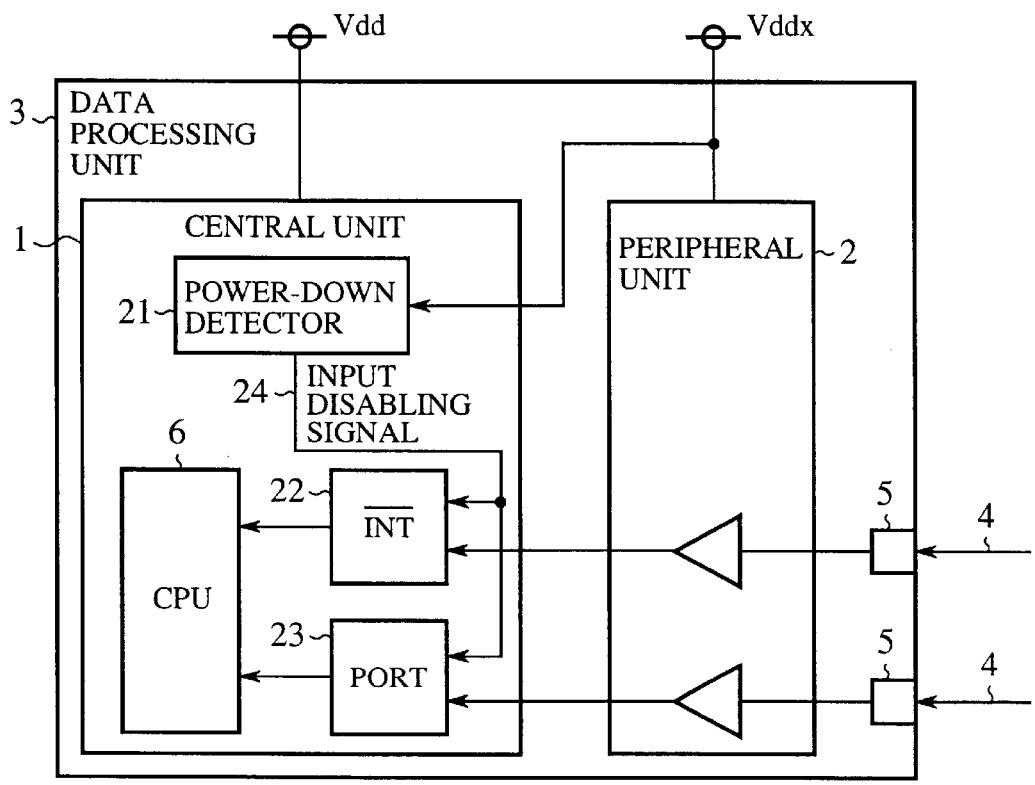
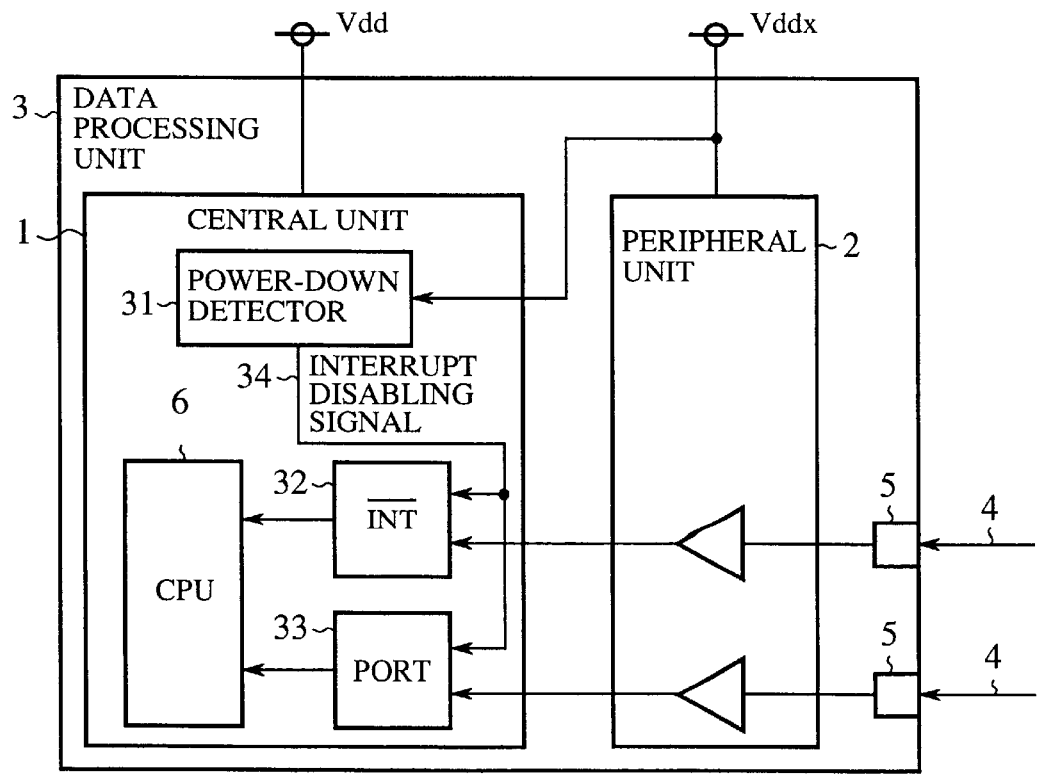

DATA PROCESSING UNIT INCLUDING CENTRAL UNIT AND PERIPHERAL UNIT DRIVEN BY SEPARATE POWER SUPPLIES

BACKGROUND OF THE INVENTION

1. Field of the Invention

The present invention relates to a data processing unit, and particularly to a data processing unit including a central unit and a peripheral unit operating on separate power supplies.

2. Description of Related Art

FIG. 7 is a block diagram showing a configuration of a conventional data processing unit comprising separate power supplies for its central unit and peripheral unit. In this figure, the reference symbol Vdd designates a power supply for a central unit (called a central use power supply from now on); Vddx designates a power supply for a peripheral unit (called a peripheral use power supply from now on) including a battery;. 100 designates the central unit that includes a CPU and the like and operates on the central use power supply Vdd; 101 designates the peripheral unit that operates on the peripheral use power supply Vddx; 102 designates a data processing unit including the two power supplies, the central use power supply Vdd and the peripheral use power supply Vddx; and each reference numeral 103 designates an input signal to the data processing unit 102.

As the central use power supply Vdd, a stable power supply is used such as a new cell of sufficient capacity. On the other hand, as the peripheral use power supply Vddx, a battery is used which can cause an unexpected power failure (called power down from now on). The power down can arise from an unstable supply voltage due to a battery fault or due to a long time use beyond the lifetime of the battery.

With the foregoing arrangement including the separate power supplies for the central unit and peripheral unit, the conventional data processing unit has a problem in that when the peripheral use power supply Vddx falls into an unexpected power down and its output voltage drops to a low (L) level, the input signals can change their levels from a high (H) to L level, and this can bring about an undesired interrupt if the external interrupt is active at the L level, or cause an unintended signal to enter the central unit.

SUMMARY OF THE INVENTION

The present invention is implemented to solve the foregoing problem. It is therefore an object of the present invention to provide a data processing unit capable of preventing a malfunction even if an unstable power supply of a plurality of power supplies causes an unexpected power down.

According to a first aspect of the present invention, there is provide a data processing unit comprising: a first power supply consisting of a stable power supply; a central unit operating on the first power supply; a second power supply; a peripheral unit operating on the second power supply; an interface block for transferring an external input signal to the peripheral unit; and a power-down detector operating on the first power supply and connected to the second power supply, for detecting a power down of the second power supply and for generating a signal informing of the power down when it takes place.

Here, the central unit may comprise a processing block for processing the external input signal supplied through the peripheral unit, and the processing block may disable the external input signal in response to the signal informing of the power down output from the power-down detector.

The central unit may comprise an interrupt handling circuit for executing interrupt processing of the external input signal consisting of an external interrupt signal supplied through the peripheral unit, and the interrupt handling circuit may disable the external interrupt signal in response to the signal informing of the power down output from the power-down detector.

The central unit may comprise a processing block for temporarily storing and holding a data value of the external input signal supplied through the peripheral unit, and the processing block may hold the data value temporarily stored, and disable further input of the external input signal to the processing block in response to the signal informing of the power down output from the power-down detector.

The central unit may comprise a CPU for executing operations, and the CPU may execute an interrupt handler that disables an input of the external input signal in response to the signal informing of the power down output from the power-down detector.

The central unit may include the power-down detector.

BRIEF DESCRIPTION OF THE DRAWINGS

FIG. 3 is a block diagram showing a configuration of an embodiment 2 of the data processing unit including separate power supplies for its central unit and peripheral unit in accordance with the present invention;

FIG. 4 is a block diagram showing a configuration of an embodiment 3 of the data processing unit including separate power supplies for its central unit and peripheral unit in accordance with the present invention;

DETAILED DESCRIPTION OF THE PREFERRED EMBODIMENTS

The invention will now be described with reference to the accompanying drawings.

Embodiment 1

Figure 1:
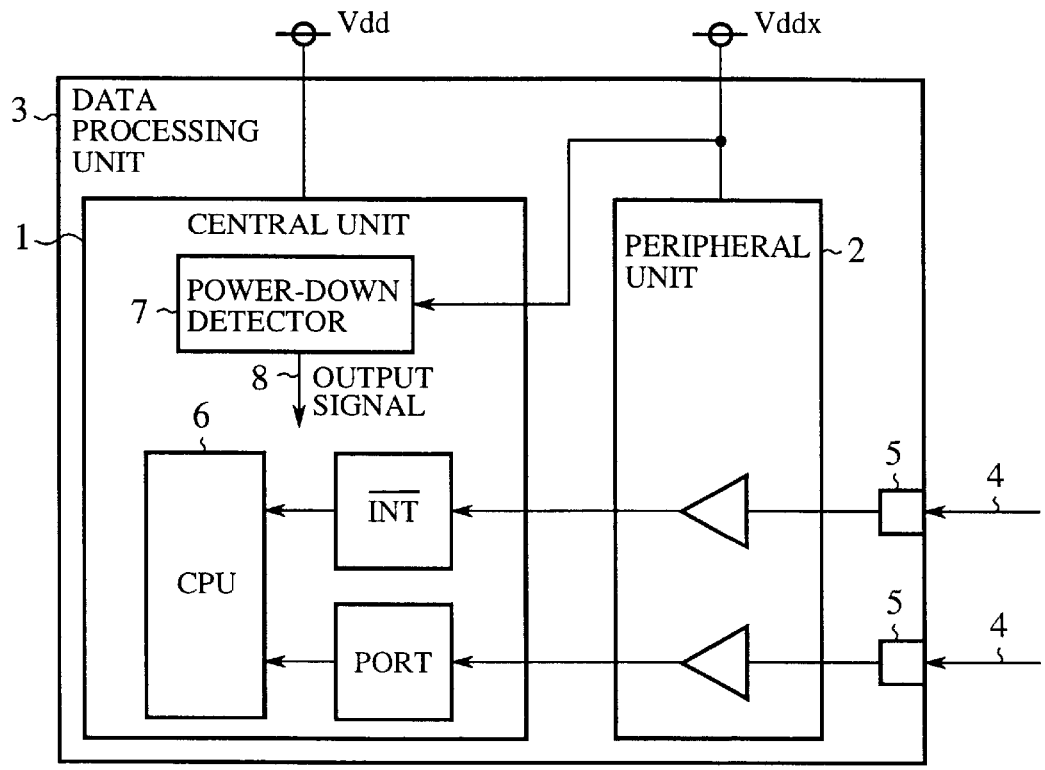
FIG. 1 is a block diagram showing a configuration of an embodiment 1 of a data processing unit including separate power supplies for its central unit and peripheral unit in accordance with the present invention.

FIG. 1 is a block diagram showing a configuration of an embodiment 1 of a data processing unit including separate power supplies for its central unit and peripheral unit in accordance with the present invention. In this figure, the reference symbol Vdd designates a central use power supply consisting of a stable power supply such as a new cell with a sufficient capacity; Vddx designates a peripheral use power supply consisting of a battery or the like; 1 designates a central unit that includes a CPU or the like and operates on the central use power supply Vdd; 2 designates a peripheral unit that operates on the peripheral use power supply Vddx; 3 designates a data processing unit including two power supplies, the central use power supply Vdd and the peripheral use power supply Vddx; 4 each designate an input signal supplied to the data processing unit 3; 5 each designate an interface block for capturing the external signal into the data processing unit. 3; 6 designates a CPU incorporated into the central unit 1 for performing various operations; 7 designates a. power-down detector for detecting power down of the peripheral use power supply Vddx, which is incorporated into the central unit 1 and operates on the central use power supply Vdd; and 8 designates an output signal produced from the power-down detector 7.

Figure 2:
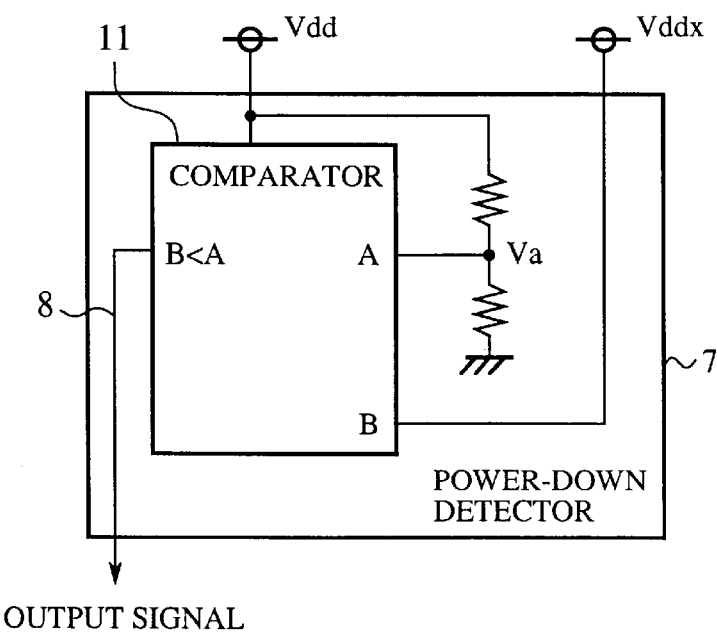
FIG. 2 is a block diagram showing a configuration of a power-down detector.

FIG. 2 is a block diagram showing a configuration of the power-down detector 7. In this figure, the same reference numerals designate the same or like portions as those of FIG. 1, and the description thereof is omitted here. In FIG. 2, the reference symbol Va designates a reference voltage obtained by dividing the output voltage of the central use power supply Vdd; and 11 designates a comparator for comparing the voltage of the peripheral use power supply Vddx with the reference voltage Va. As the output signal 8, a L level negation signal is output when the voltage of the peripheral use power supply Vddx is greater than the reference voltage Va, whereas a H level assertion signal is output if the voltage of the peripheral use power supply Vddx drops below the reference voltage Va.

Various types of comparators based on known techniques can be used as the comparator 11. A simple example of the comparator consists of an AND gate that receives at its inputs A and B the H level reference voltage Va and the inverted output voltage of the peripheral use power supply Vddx, respectively, and produces its output as the output signal 8. This circuit produces, when the power down takes place in the peripheral use power supply Vddx and its voltage drops to the L level, the H level signal as the output of the power-down detector 7.

Next, the operation of the present embodiment 1 will be described.

If the peripheral use power supply Vddx as shown in FIG. 2 brings about a power down such as an instantaneous power failure, its voltage drops to the L level below the reference voltage Va, and the output signal 8 of the H level is generated as the assertion signal. In this case, the power down of the peripheral use power supply Vddx can be positively detected because the. power-down detector 7 operates on the stable central use power supply Vdd.

As described above, according to the present embodiment 1, the peripheral use power supply Vddx is connected to the power-down detector operating on the stable central use power supply Vdd. This offers an advantage of being able to positively detect the power down even if the peripheral use power supply Vddx causes an unexpected power down. In addition, detecting the power down by the central unit 1 brings an advantage of being able to collect information on a malfunction of the peripheral unit 2 such as that of its input operation.

Incidentally, FIG. 2 shows only an example of the power-down detector, and other circuit configurations can be used as long as they can detect the power down of the peripheral use power supply Vddx using the stable central use power supply Vdd.

Furthermore, such a configuration is possible that the peripheral use power supply Vddx, which consists of an ordinary battery, supplies power to the central use power supply Vdd through a large capacity capacitor to implement the stable power supply Vdd. In this configuration, if the peripheral use power supply Vddx brings about a power down such as an instantaneous power failure, and the central unit, receiving the signal indicating the power down, can drop its operation speed or halt its clock so that the central unit enters a mode of reducing its power consumption in the power supply state from the central use power supply Vdd. This makes it possible to establish a mode that can prevent the contents of memory devices such as registers from being damaged because of the instantaneous power failure of the peripheral use power supply Vddx, and to use the contents of the memory devices such as registers again when the supply of the power from the peripheral use power supply Vddx is restored.

Embodiment 2

FIG. 3 is a block diagram showing a configuration of an embodiment 2 of the data processing unit including separate power supplies for its central unit and peripheral unit in accordance with the present invention. In FIG. 3, the same reference symbols designate the same or like portions to those of FIG. 1, and the description thereof is omitted here. The reference numeral 21 designates a. power-down detector that is installed in the central unit and operates on the central use power supply Vdd to generate an input disabling signal described below; 22 and 23 each designate a processing block for receiving an input signal from a peripheral unit 2, for carrying out processing of the input signal and for supplying the CPU 6 with processing results; and 24 designates the input disabling signal supplied from the power-down detector 21 to the processing blocks 22 and 23 to disable the input to the processing blocks 22 and 23 from the peripheral unit 2 in case of the power down of the peripheral use power supply Vddx. As the input disabling signal, a L level negation signal is output when the peripheral use power supply Vddx is in a normal state, whereas a H level assertion signal is output when the peripheral use power supply Vddx brings about a power down. The power-down detector 21 can be the same circuit as that shown in FIG. 2.

To disable the external input signals by the input disabling signal, various techniques are known to construct concrete configurations. One of the simplest signal disabling means can comprise, when the processing blocks 22 and 23 become active in response to the H level input signal, an inverter for inverting the input disabling signal, and an AND gate for ANDing the inverted input disabling signal and the external input signal. Using the signal disabling means to AND the external input signal and the inverted input disabling signal which is output as the H level assertion signal makes it possible to disable the external input signals from being supplied to the processing blocks 22 and 23. On the other hand, when the processing blocks 22 and 23 become active in response to the L level input signal, the signal disabling means can comprise a NOR gate that receives at its inputs the input disabling signal and the external input signal, and an inverter for inverting the output signal of the NOR gate. Using the signal disabling means can disable the external input signals because the inputs to the processing blocks 22 and 23 become H level when the H level assertion signal is supplied as the input disabling signal.

Next, the operation of the present embodiment 2 will be described.

When the peripheral use power supply Vddx outputs the normal voltage, the power-down detector 21 outputs the L level negation signal. In contrast, when the peripheral use power supply Vddx brings about a power down such as an instantaneous power failure, its output voltage becomes L level. Thus, the power-down detector 21 outputs the H level assertion signal as the input disabling signal. In response to the H level assertion signal, the processing blocks 22 and 23 disable the external signals from the peripheral unit 2.

As described above, the present embodiment 2 is configured such that the power-down detector 21, which operates on the stable central use power supply Vdd, outputs the H level assertion signal as the input disabling signal when the peripheral use power supply Vddx brings about the power down, thereby disabling the input signals from being supplied from the peripheral unit 2 to the processing blocks 22 and 23. This offers an advantage of being able to prevent the malfunction of the central unit in case of the power down because the input is disabled of the erroneous external input signal.

Embodiment 3

FIG. 4 is a block diagram showing a configuration of an embodiment 3 of the data processing unit including separate power supplies for its central unit and peripheral unit in accordance with the present invention. In FIG. 4, the same reference symbols designate the same or like portions to those of FIG. 1, and the description thereof is omitted here. The reference numeral 31 designates a power-down detector that is installed in the central unit 1 and operates on the central use power supply Vdd to generate an interrupt disabling signal described below; 32 and 33 each designate an interrupt handling circuit for receiving an external interrupt signal supplied via the peripheral unit 2 to execute interrupt processing based on the interrupt signal; and 34 designates the interrupt disabling signal supplied from the power-down detector 31 to the interrupt handling circuits. 32 and 33 to disable the interrupt signal from being supplied from the peripheral unit 2 to the interrupt handling circuits 32 and 33 in case of the power down of the peripheral use power supply Vddx. As the interrupt disabling signal, a L level negation signal is generated when the peripheral use power supply Vddx is in the normal state, whereas a H level assertion signal is generated when the output voltage of the peripheral use power supply Vddx drops to the L level because of the power down. As the power-down detector 31, the same circuit as that shown in FIG. 2 can be employed.

Next, the operation of the present embodiment 3 will be described.

When the peripheral use power supply Vddx as shown in FIG. 4 outputs the normal voltage, the power-down detector 31 outputs the L level negation signal. On the other hand, when the peripheral use power supply Vddx causes a power down such as an instantaneous power failure, its output voltage becomes L level, and the power-down detector 31 generates the H level assertion signal as the interrupt disabling signal. The power down of the peripheral use power supply Vddx can produce a L level interrupt signal, which will assert the interrupt if the interrupt signal is "L active" and the interrupt handling circuits 32 and 33 are not supplied with the interrupt disabling signal. However, this does not occur because the H level interrupt disabling signal is supplied to the interrupt handling circuits 32 and 33, and it disables the undesired interrupt signal.

As described above, the present embodiment 3 is configured such that the power-down detector 31, which operates on the stable central use power supply Vdd, generates the H level assertion signal as the interrupt disabling signal when the peripheral use power supply Vddx brings about the power down, and disables the interrupt signal from being supplied from the peripheral unit 2 to the interrupt handling circuits 32 and 33. This offers an advantage of being able to prevent the malfunction of the central unit 1 in case of the power down because the undesired interrupt signal is disabled.

Embodiment 4

Figure 5:
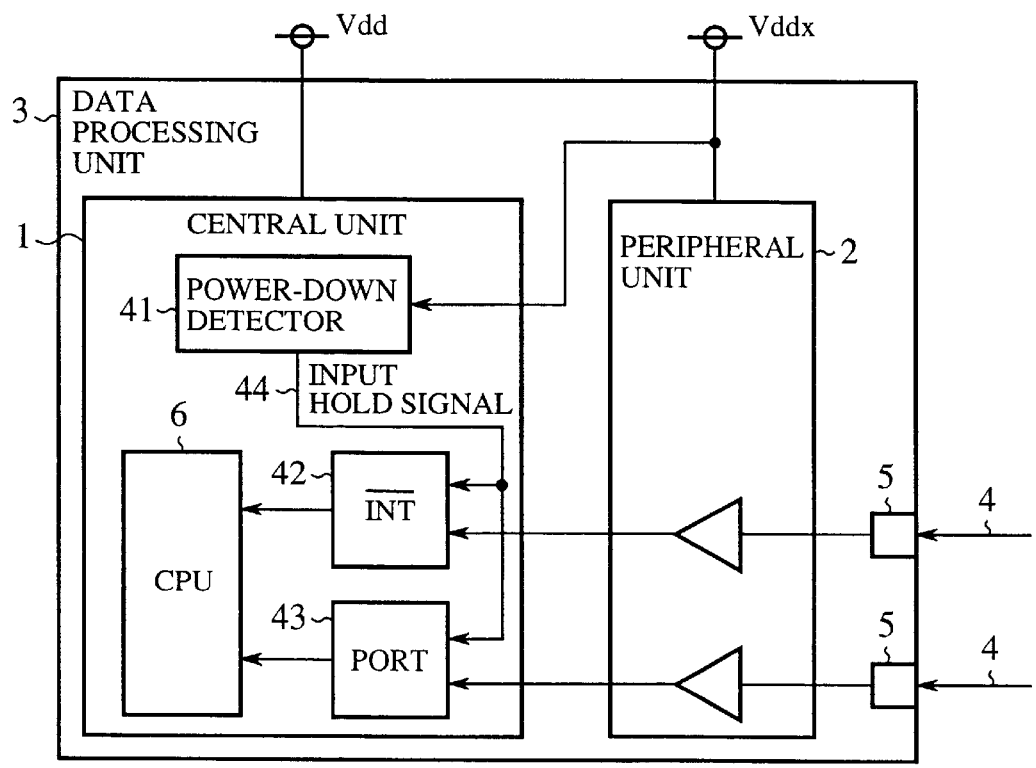
FIG. 5 is a block diagram showing a configuration of an embodiment 4 of the data processing unit including separate power supplies for its central unit and peripheral unit in accordance with the present invention.

FIG. 5 is a block diagram showing a configuration of an embodiment 4 of the data processing unit including separate power supplies for its central unit and peripheral unit in accordance with the present invention. In FIG. 5, the same reference symbols designate the same or like portions to those of FIG. 1, and the description thereof is omitted here. The reference numeral 41 designates a power-down detector that is installed in the central unit 1 and operates on the central use power supply Vdd to generate an input hold signal described below; 42 and 43 each designate a processing block that receives the input signal from the peripheral unit 2, executes processing of the input signal and supplies the CPU with processing results, and that latches and holds the data values of the input signal; and 44 designates the input hold signal supplied from the power-down detector 41 to the processing blocks 42 and 43 to disable new inputs to the processing blocks 42 and 43 by holding, in case of a power down of the peripheral use power supply Vddx, the data values latched in the processing blocks 42 and 43 immediately before the power down. As the input hold signal, a L level negation signal is generated when the peripheral use power supply Vddx is in the normal state, whereas a H level assertion signal is generated when the output voltage of the peripheral use power supply Vddx drops to the L level because of the power down. As the power-down detector 41, the same circuit as shown in FIG. 2 can be employed.

The circuit for holding the data values latched just before the power down is installed for the following reason. If the peripheral use power supply Vddx brings about an unexpected power down, the input signal lines can be brought into a high impedance state, thereby supplying undefined input signals. Thus, it is desired to hold the data values immediately before the power down to supply the definite data values to the CPU.

Next, the operation of the present embodiment 4 will be described.

When the peripheral use power supply Vddx as shown in FIG. 5 outputs the normal voltage, the power-down detector 41 outputs the L level negation signal. On the other hand, when the peripheral use power supply Vddx falls into a power down such as an instantaneous power failure, its output voltage becomes L level, and the power-down detector 41 generates the H level assertion signal as the input hold signal. Receiving the H level assertion signal, the processing blocks 42 and 43 hold the immediately previous data values latched by the processing blocks 42 and 43, thereby disabling the new signal input from the peripheral unit 2.

As described above, the present embodiment 4 is configured such that the power-down detector 41, which operates on the stable central use power supply Vdd, outputs the H level assertion signal as the input hold signal in case of a power down of the peripheral use power supply Vddx so that the processing blocks 42 and 43 hold the data values latched immediately before the power down, and disable the new signal input to the processing blocks 42 and 43. This offers an advantage of being able to prevent the malfunction of the central unit 1 in the event of power down because the CPU is supplied with the definite values instead of the disabled new input, and to facilitate the recovery to the normal operation because the data values immediately before the power down are held.

Embodiment 5

Figure 6:
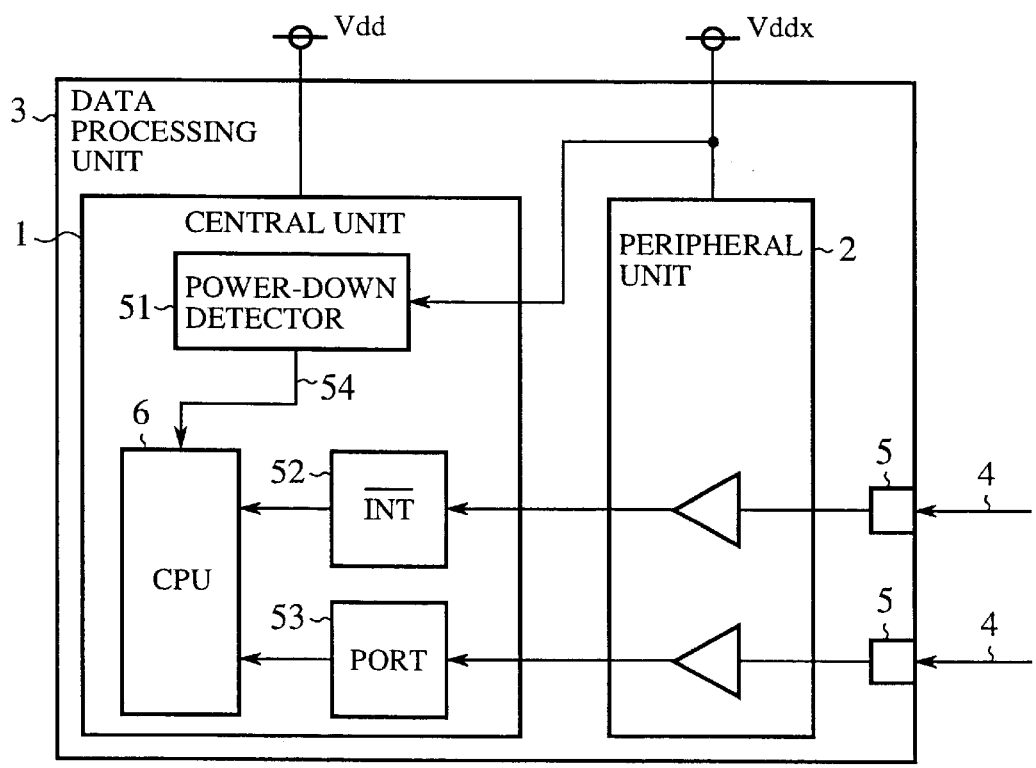
FIG. 6 is a block diagram showing a configuration of an embodiment 5 of the data processing unit including separate power supplies for its central unit and peripheral unit in accordance with the present invention.
Figure 7:
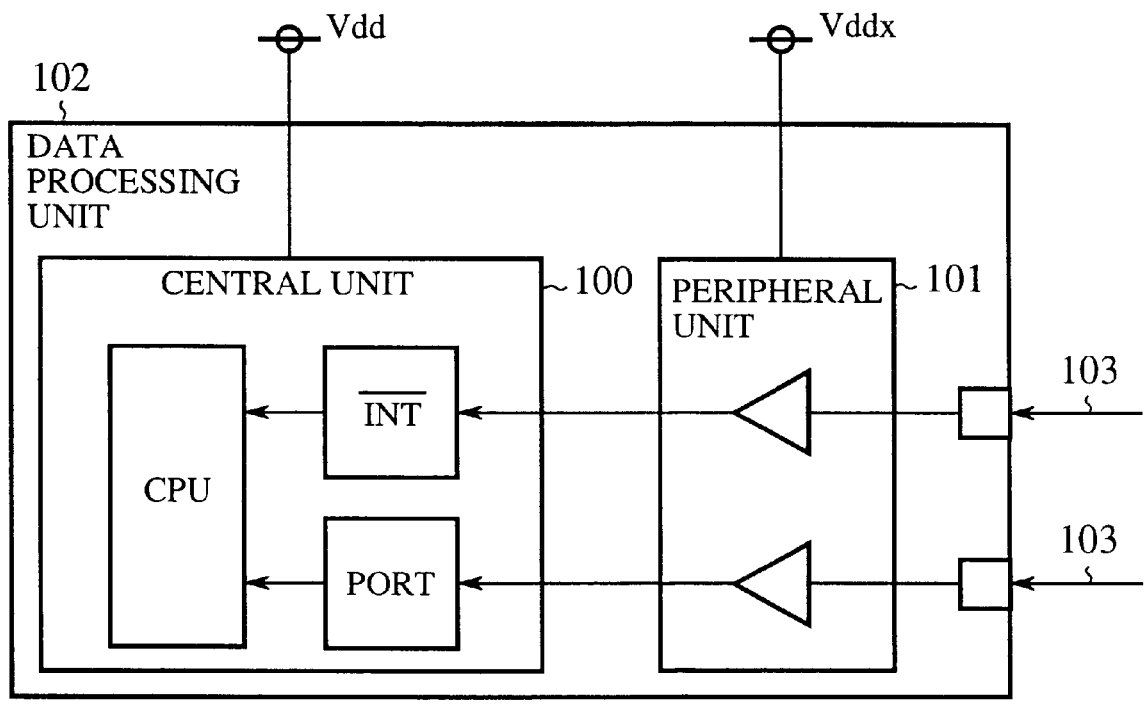
FIG. 7 is a block diagram showing a configuration of a conventional data processing unit comprising separate power supplies for its central unit and peripheral unit.

FIG. 6 is a block diagram showing a configuration of an embodiment 5 of the data processing unit including separate power supplies for its central unit and peripheral unit in accordance with the present invention. In FIG. 6, the same reference symbols designate the same or like portions to those of FIG. 1, and the description thereof is omitted here. The reference numeral 51 designates a power-down detector that is installed in the central unit 1 and operates on the central use power supply Vdd to generate a power down interrupt signal described below; 52 and 53 each designate a processing block for receiving an external signal supplied via the peripheral unit 2 and for supplying the CPU 6 with processing results; and 54 designates the power down interrupt signal supplied from the power-down detector 51 to the CPU 6 to have the CPU 6 execute an interrupt handler for disabling the signals supplied from the processing blocks 52 and 53 in case of the power down of the peripheral use power supply Vddx. As the power down interrupt signal, a L level negation signal is generated when the peripheral use power supply Vddx is in the normal state, whereas a H level assertion signal is generated when the output voltage of the peripheral use power supply Vddx drops to the L level because of the power down. As the power-down detector 51, the same circuit as that shown in FIG. 2 can be employed.

Next, the operation of the present embodiment 5 will be described.

When the peripheral use power supply Vddx as shown in FIG. 6 outputs the normal voltage, the power-down detector 51 outputs the L level negation signal. On the other hand, when the peripheral use power supply Vddx brings about a power down such as an instantaneous power failure, its output voltage becomes L level, and the power-down detector 51 generates the H level assertion signal as the power down interrupt signal. Receiving the H level assertion signal, the CPU 6 executes the interrupt handler to disable the signal input to the CPU 6 from the processing blocks 52 and 53 that process the external input signals.

As described above, the present embodiment 5 is configured such that the power-down detector 51, which operates on the stable central use power supply Vdd, generates the H level assertion signal as the power down interrupt signal when the peripheral use power supply Vddx brings about the power down in order to disable the signals from being supplied to the CPU 6 from the processing blocks 52 and 53 that process the external input signals. This offers an advantage of being able to prevent the malfunction of the central unit in case of the power down because the input of the undesired signals to the CPU is disabled.

The present invention is described in the foregoing embodiments 1–5 by way of example of the data processing unit that can cope with an unexpected power down of the peripheral use power supply Vddx due to an incidental outage such as an instantaneous power failure. The application of the present invention, however, is not limited to this. For example, the present invention is applicable to such a system that intentionally brings about a power down of the peripheral use power supply Vddx to implement power saving of the data processing unit to reduce power consumption of a battery of mobile information equipment or the like.

What is claimed is:

1. A data processing unit comprising:
    a first power supply consisting of a stable power supply;
    a central unit operating on said first power supply;
    a second power supply;
    a peripheral unit operating on said second power supply;
    an interface block for transferring an external input signal to said peripheral unit; and
    a power-down detector operating on said first power supply and directly connected to said second power supply, for detecting a power down of said second power supply and for generating a signal informing of the power down when it takes place, wherein said central unit enters a reduced power consumption mode upon receiving said power down signal.

2. The data processing unit according to claim 1, wherein said central unit comprises a processing block for processing the external input signal supplied through said peripheral unit, and wherein said processing block disables the external input signal in response to the signal informing of the power down output from said power-down detector.

3. The data processing unit according to claim 1, wherein said central unit comprises an interrupt handling circuit for executing interrupt processing of the external input signal consisting of an external interrupt signal supplied through said peripheral unit, and wherein the interrupt handling circuit disables the external interrupt signal in response to the signal informing of said power down output from said power-down detector.

4. The data processing unit according to claim 1, wherein said central unit comprises a processing block for temporarily storing and holding a data value of the external input signal supplied through said peripheral unit, and wherein said processing block holds the data value temporarily stored, and disables further input of the external input signal to said processing block in response to the signal informing of the power down output from said power-down detector.

5. The data processing unit according to claim 1, wherein said central unit comprises a CPU for executing operations, and wherein said CPU executes an interrupt handler that disables an input of the external input signal in response to the signal informing of the power down from said power-down detector.

6. The data processing unit according to claim 1, wherein said central unit includes said power-down detector.

7. A data processing unit comprising:
    a first power supply consisting of a stable power supply;
    a central unit operating on said first power supply;
    a second power supply;
    a peripheral unit operating on said second power supply;
    an interface block for transferring an external input signal to said peripheral unit; and
    a power-down detector operating on said first power supply and connected to said second power supply, for detecting a power down of said second power supply by comparing a voltage level of said second power supply to a reference voltage and for outputting a signal informing said central unit of the power down when it occurs, wherein said central unit operates in a reduced power mode upon receiving said power down signal.

8. The data processing unit according to claim 7, wherein said central unit comprises a processing block for processing the external input signal supplied through said peripheral unit, and wherein said processing block disables the external input signal in response to the signal informing of the power down output from said power-down detector.

9. The data processing unit according to claim 7, wherein said central unit comprises an interrupt handling circuit for executing interrupt processing of the external input signal consisting of an external interrupt signal supplied through said peripheral unit, and wherein said interrupt handling circuit disables the external interrupt signal in response to the signal informing of the power down output from said power-down detector.

10. The data processing unit according to claim 7, wherein said central unit comprises a processing block for temporarily storing and holding a data value of the external input signal supplied through said peripheral unit, and wherein said processing block holds the data value temporarily stored, and disables further input of the external input signal to said processing block in response to the signal informing of the power down output from said power-down detector.

11. The data processing unit according to claim 7, wherein said central unit comprises a CPU for executing operations, and wherein said CPU executes an interrupt handler that disables an input of the external input signal in response to the signal informing of the power down from said power-down detector.

12. The data processing unit according to claim 7, wherein said central unit includes said power-down detector.

* * * * *